United States Patent [19]

Otawara

[11] 4,262,538

[45] Apr. 21, 1981

[54] METHOD OF DETECTING RUBBING BETWEEN ROTATING BODY AND STATIONARY BODY

[75] Inventor: Yasuhiko Otawara, Katsuta, Japan

[73] Assignee: Hitachi, Ltd., Tokyo, Japan

[21] Appl. No.: 39,288

[22] Filed: May 15, 1979

[30] Foreign Application Priority Data

May 16, 1978 [JP] Japan .................... 53-57140

[51] Int. Cl.³ ............................................ G01M 7/00
[52] U.S. Cl. ........................................ 73/593; 73/660
[58] Field of Search ............... 73/593, 579, 116, 584, 73/659, 660; 364/431

[56] References Cited

U.S. PATENT DOCUMENTS

| 3,029,385 | 4/1962 | Steinbrenner et al. ............ 73/659 X |
| 3,705,516 | 12/1972 | Reis ..................................... 73/660 X |
| 3,971,249 | 7/1976 | Bachofer ............................... 73/593 |
| 4,078,434 | 3/1978 | Weberhofer ........................... 73/593 |

*Primary Examiner*—Jerry W. Myracle
*Attorney, Agent, or Firm*—Craig & Antonelli

[57] ABSTRACT

Vibrations at a plurality of points on a turbine rotor and vibrations at corresponding points of the turbine stator are measured during a common sampling period for each corresponding points. Consequently, vibration data are obtained for each point on the turbine rotor and for each point on the turbine stator corresponding to the point on the turbine rotor. Then, a correlation coefficient representing the correlation between the vibration data of each point on the turbine rotor and the vibration data of corresponding point on the turbine stator is calculated, and the correlation coefficient is differentiated. The correlation coefficients and the differential values are then compared with respective predetermined reference values. The occurrence of rubbing is detected from the result of these comparisons.

6 Claims, 2 Drawing Figures

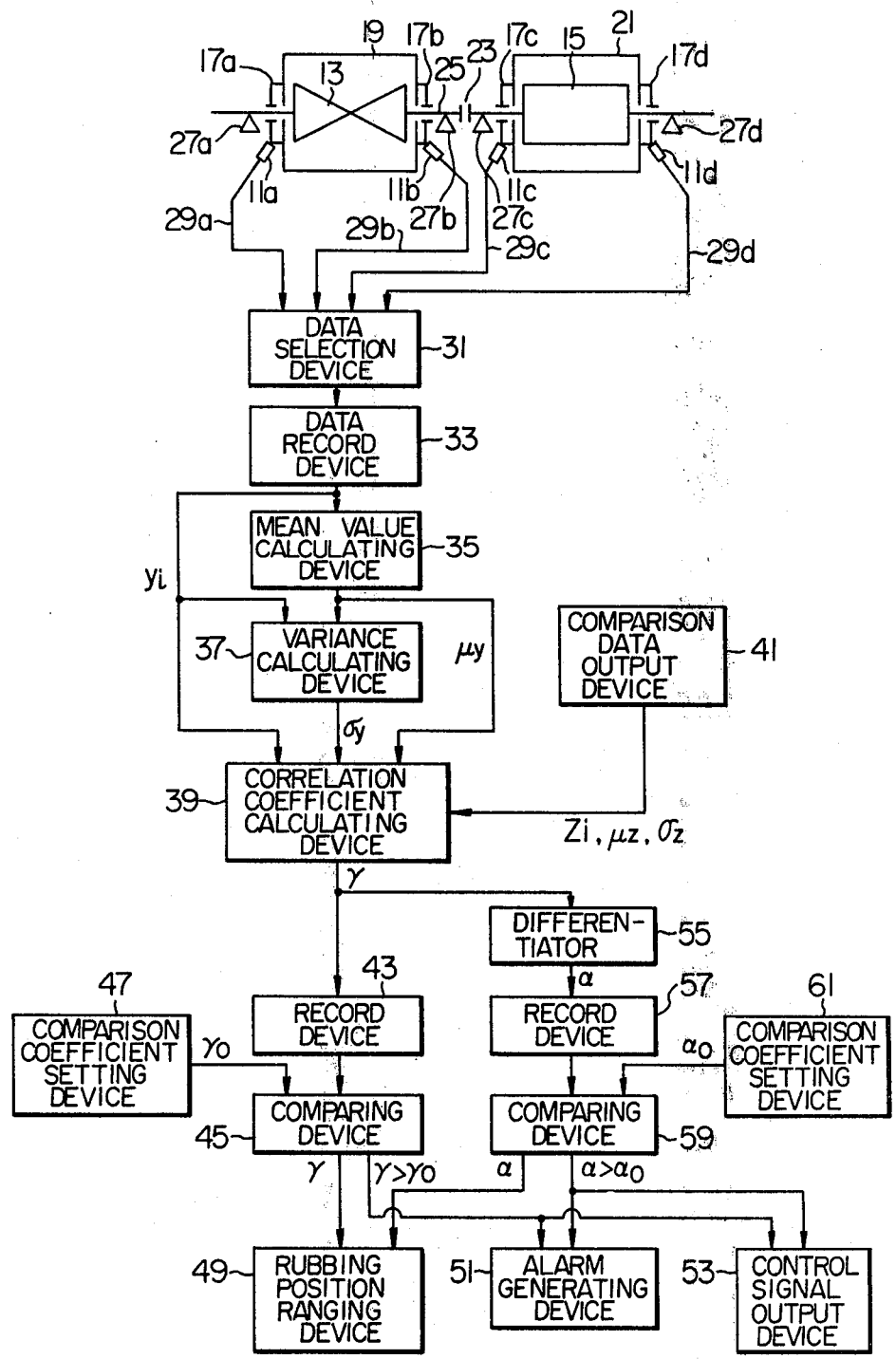

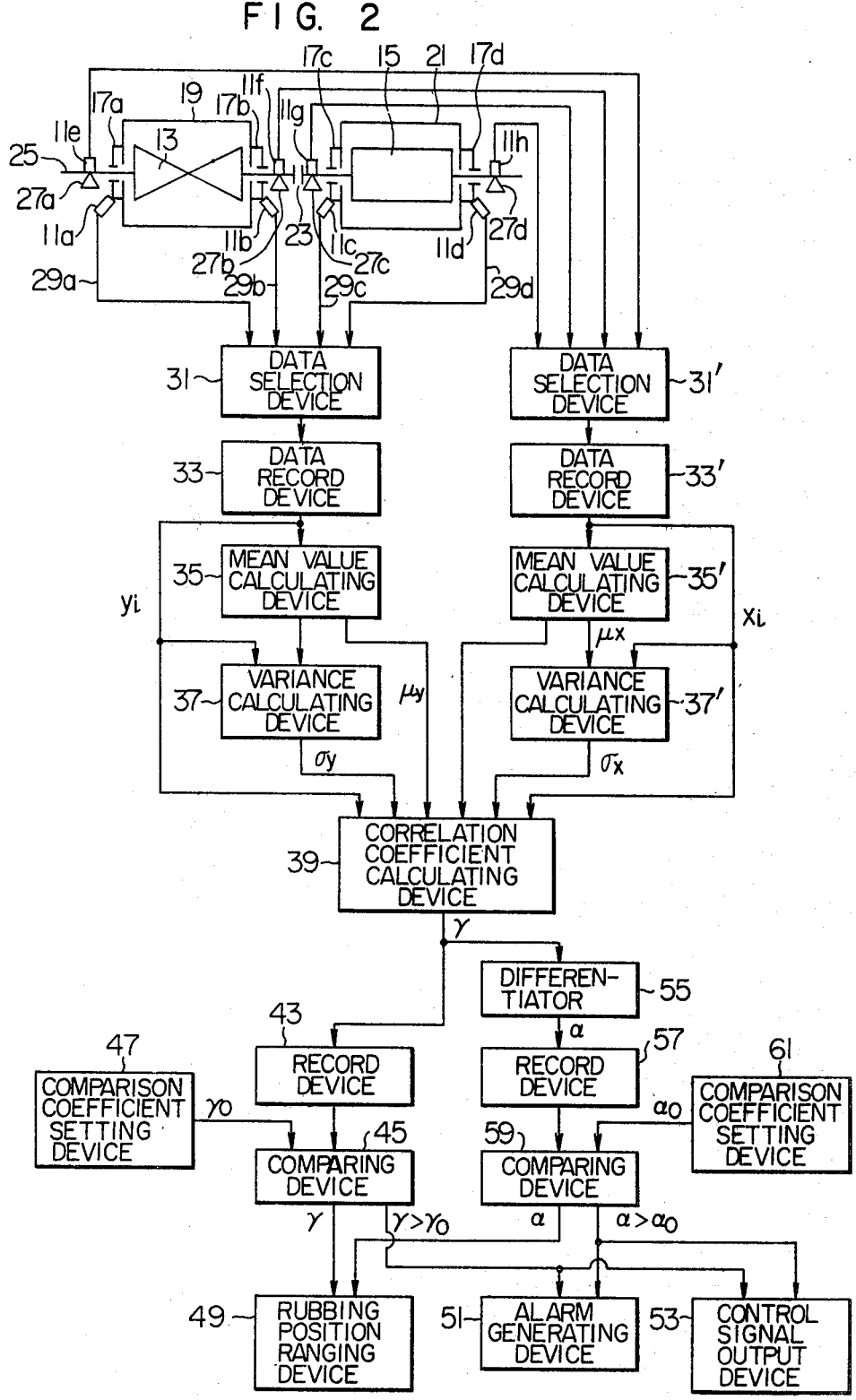

METHOD OF DETECTING RUBBING BETWEEN ROTATING BODY AND STATIONARY BODY

BACKGROUND OF THE INVENTION

1. Field Of The Invention

The present invention relates to a method of detecting rubbing (contact) between a rotating body and a stationary body and, more particularly, to a method of detecting rubbing between a rotating body of a rotary machine rotatively driven by a working fluid and a stationary member such as a stationary sealing member disposed around the rotary body to prevent leak of the working fluid through the gap between the rotating body and the stationary part of the rotary machine.

2. Description Of The Prior Art

In a rotary machine such as a steam turbine, it is essential to prevent the leak of the working fluid for a safe and efficient operation of the machine. In order to prevent this leak of the working fluid, a noncontact type sealing measure employing a comb-like sealing device has been adopted. In this type of sealing measure, the rate of leak of the working fluid is decreased as the gap between the comb-like sealing member and the rotor is reduced. For this reason, the gap between the rotor and the comb-like sealing member is preferably reduced.

In this type of sealing measure, however, it is often experienced that the rotor is slightly displaced relatively to the comb-like sealing member to make a contact with the latter, due to various reasons such as change of operating condition of the turbine during transient period such as acceleration. This state of contact between the rotor and the sealing member is generally referred to as "rubbing".

Similar problem is experienced also in case of an oil shield which is used in combination with a plain bearing and adapted for preventing oil from leaking to the outside.

The rubbing between the rotating and stationary members generates a heat in the area around the point of contact, due to the friction, particularly when the rotating member is being rotated at a high speed as is the case of a steam turbine. This heat undesirably deflects the rotor to cause an unbalance of gyrating mass of the shaft, resulting in so-called rubbing vibration.

This rubbing vibration in some cases leads to a divergent vibration of increased amplitude. It is therefore strictly required to detect rubbing between the stationary member and the rotating member at an early stage and to take a necessary countermeasure without delay. A typical countermeasure is, for example, to reduce the rate of acceleration or to stop to continue the changing of load or operating condition to make the operation steady.

Various methods have been proposed up to now for detecting rubbing between the rotary member and the stationary member, one of which employs a vibrometer attached to the portion where the generation of rubbing is expected to take place. This detecting method is to pick up the vibration generated in the stationary member as a result of rubbing. This method, however, involves a problem that it is extremely difficult to discriminate the vibration caused by rubbing from the vibration caused by the machine itself. More specifically, the vibration detected by the vibrometer usually includes various components such as a component attributable to the resonance frequency of the stationary member itself, a component attributable to a change in the condition of the steam and so forth. It is possible only through operator's feeling and experience to judge whether the vibration component due to rubbing is involved by the vibration as detected by the vibrometer. Such a judgement based upon the operator's feeling and experience is not reliable and, therefore, is defective.

In order to obviate the above stated problem, it has been proposed in Japanese Patent Laid-open Publication No. 80874/1975 to compare the actually measured vibration pattern with previously memorized patterns of vibrations attributable to various reasons. According to this method, the cause of the vibration is detected as a disposal instruction corresponding to a cause such as rubbing is selected in accordance with the result of the pattern recognition or comparison.

This method relying upon the comparison of patterns making use of a pattern recognition technique, however, poses a new problem that the extent of overlap or coincidence of two patterns, with which it is judged that the cause of the vibration, e.g. rubbing, is taking place, can hardly be determined definitely. A fluctuation of detecting precision is therefore unavoidable.

At the same time, the above-mentioned Japanese Patent Laid-open Publication No. 80874/1975 offers only how to discriminate the causes of the vibration, and fails to teach how to range the position at which the cause of the vibration is taking place.

SUMMARY OF THE INVENTION

It is therefore an object of the invention to provide a reliable method of detecting rubbing taking place between a rotating body and a stationary body.

It is another object of the invention to provide a method which would permit an accurate or precise detection of rubbing between a rotary body and a stationary body, avoiding fluctuation of precision of detection.

It is still another object of the invention to provide a method which permits a rapid detection of rubbing between a rotating body and a stationary body.

It is a further object of the invention to provide a method which permits an easy ranging of the position at which rubbing is taking place.

To these ends, according to the invention, there is provided a method of detecting rubbing taking place between a rotating body and a stationary body, comprising the steps of: measuring the vibration at a predetermined portion of at least one of said rotating body and said stationary body; calculating a correlation coefficient from the one or two actually measured data and reference data; comparing the calculated correlation coefficient with a predetermined value of correlation coefficient; and detecting the rubbing through evaluation of the result of the comparison.

The detection method offers various advantages such as high objectively, accuracy and small fluctuation of the detection.

BRIEF DESCRIPTION OF THE DRAWINGS

FIG. 1 shows an example of a system for carrying out the method of the invention for detecting rubbing taking place between a rotating body and a stationary body; and FIG. 2 shows a system for carrying out a method which is another embodiment of the invention, for detecting rubbing taking place between a rotating body and a stationary body.

DESCRIPTION OF THE PREFERRED EMBODIMENTS

The description of the preferred embodiments of the invention will be commenced with an explanation of theory of the method of invention for detecting rubbing taking place between a rotating body and a stationary body.

The correlation between two vibration data is investigated and determined. The vibration values (amplitude, velocity or vibro-acceleration) of two vibration date at an instant t are represented by Y and Z, respectively. The moment zero can be determined optionally for Y and Z. Mean values $\mu_y$ and $\mu_z$ and variances $\sigma_y$ and $\sigma_z$ over a data sampling period T are given by the following equations (1) to (4), respectively.

$$\mu_y = \frac{1}{T} \int_0^T y \, dt \qquad (1)$$

$$\mu_z = \frac{1}{T} \int_0^T z \, dt \qquad (2)$$

$$\sigma_y^2 = \frac{1}{T} \int_0^T (y - \mu_y)^2 dt \qquad (3)$$

$$\sigma_z^2 = \frac{1}{T} \int_0^T (z - \mu_z)^2 dt \qquad (4)$$

Meanwhile, the correlation coefficient $\gamma$ between Y and Z are given by the equation (5).

$$\gamma = \frac{1}{T} \int_0^T (\frac{y - \mu_y}{\sigma_y})(\frac{z - \mu_z}{\sigma_z}) dt \qquad (5)$$

Provided that Y equals to Z, the coefficient $\gamma$ equals to 1, because of the relationships $\mu_y = \mu_z$ and $\sigma_y = \sigma_z$. Namely, if the vibration values Y and Z are close enough or identical to each other, the correlation coefficient representing the correlation between two data is equal to 1 (one).

To the contrary, provided that the correlation between two vibration values Y and Z is remote, the correlation coefficient $\gamma$ is reduced and finally becomes 0 (zero) when there is no fixed relation between the vibration values Y and Z.

At the same time, when the two vibration data include other vibration components Y' and Z' in addition to the vibration components Y and Z in question, the correlation coefficient is given by the following equation (5).

$$\gamma' = \frac{1}{T} \int_0^T (\frac{y - \mu_y}{\sigma_y} + \frac{y' - \mu_{y'}}{\sigma_{y'}})(\frac{z - \mu_z}{\sigma_z} + \frac{z' - \mu_{z'}}{\sigma_{z'}}) dt \qquad (5')$$

This equation (5') can be expanded as follows.

$$\gamma' = \frac{1}{T} \int_0^T (\frac{y - \mu_y}{\sigma_y})(\frac{z - \mu_z}{\sigma_z}) dt + \qquad (5'')$$

$$\frac{1}{T} \int_0^T (\frac{y - \mu_y}{\sigma_y})(\frac{z' - \mu_{z'}}{\sigma_{z'}}) dt +$$

$$\frac{1}{T} \int_0^T (\frac{y' - \mu_{y'}}{\sigma_{y'}})(\frac{z - \mu_z}{\sigma_z}) dt +$$

$$\frac{1}{T} \int_0^T (\frac{y' - \mu_{y'}}{\sigma_{y'}})(\frac{z' - \mu_{z'}}{\sigma_{z'}}) dt$$

where $\mu_{y'}$ and $\sigma_{y'}$ represent the mean value and variance of Y', while $\mu_{z'}$ and $\sigma_{z'}$ represent the mean value and variance of Z', respectively.

The second to fourth terms of the expanded equation (5'') are zero and negligible if there are no relation between Y and Z', Y' and Z and Y' and Z'.

It is therefore possible to detect the change of vibration mode attributable to the vibration component in question without being affected by other vibration component, through determining the correlation coefficient between two vibration data, even when the detected data include vibration components other than the vibration component in question.

Since rubbing takes place when a rotating body and a stationary body are brought into contact with each other for any reason, the occurrence of the rubbing can be detected by an observation of vibration of at least one of the rotating and stationary bodies.

Hereinafter, the method of detecting rubbing between a rotating body and a stationary body in accordance with the invention, based upon the above explained principle, will be fully described with reference to the accompanying drawings.

FIG. 1 shows a system for carrying out a method for detecting rubbing between a rotary body and a stationary body, which method is an embodiment of the invention. This system is for detecting the occurence of vibration in accordance with a correlation coefficient calculated from actually measured vibration data on the stationary body of a rotary machine and from reference vibration data which have been previously obtained by measuring with the stationary part of the same rotary machine in the rubbing state and under the same condition of operation.

Referring first to FIG. 1, in order to measure the vibrations at predetermined points on shaft packings 17a, 17b, 17c, 17d as stationary bodies, vibrometers 11a, 11b, 11c and 11d are attached to corresponding shaft packings 17a, 17b, 17c and 17d. The shaft packings 17a and 17b are attached to a turbine housing 19 accomodating a turbine rotor 13, while the shaft packings 17c and 17d are attached to a generator housing 21 accomodating a generator rotor 15.

The turbine rotor 13 and the generator rotor 15 are connected to each other by means of shafts 25 through a coupling 23. The shafts 25 are supported by means of bearings 27a, 27b, 27c and 27d.

The vibration data Ya, Yb, Yc and Yd measured at respective points on the shaft packings 17a, 17b, 17c and 17d are delivered to a data selection device 31 through data transfer lines 29a, 29b, 29c and 29d, respectively.

The data selection device 31 serves to successively select the data Ya, Yb, Yc and Yd transmitted from respective vibrometers 11a, 11b, 11c and 11d, in the mentioned order, and transmits them to a data record device 33.

In the data record device 33, N pieces of data are recorded for each of the measuring points over a preselected sampling period T as, for example, Yai (i=1 to N), Ybi (i=1 to N), Yci (i=1 to N) and Ydi (i=1 to N). The data Yai, Ybi, Yci and Ydi as measured for respective measuring points are delivered to a mean value calculating device 35, a variance calculating device 37 and a correlation coefficient calculating device 39.

In the mean value calculating device 35, mean values $\mu_{ya}$, $\mu_{yb}$, $\mu_{yc}$ and $\mu_{yd}$ are calculated from the measured data Yai, Ybi, Yci and Ydi, for respective measuring points, in accordance with the following equation (6).

$$\left.\begin{array}{l} \mu_{ya} = \frac{1}{N} \sum_{i=1}^{N} Yai \\ \mu_{yb} = \frac{1}{N} \sum_{i=1}^{N} Ybi \\ \mu_{yc} = \frac{1}{N} \sum_{i=1}^{N} Yci \\ \mu_{yd} = \frac{1}{N} \sum_{i=1}^{N} Ydi \end{array}\right\} \quad (6)$$

The mean values $\mu_{ya}$, $\mu_{yb}$, $\mu_{yc}$ and $\mu_{yd}$ thus calculated are delivered to the variance calculating device 37 and also to the correlation coefficient calculating device 39.

In the variance calculating device 37, variances $\sigma_{ya}$, $\sigma_{yb}$, $\sigma_{yc}$ and $\sigma_{yd}$ are calculated from the measured vibration data Yai, Ybi, Yci and Ydi and respective mean values $\mu_{ya}$, $\mu_{yb}$, $\mu_{yc}$ and $\mu_{yd}$, in accordance with the following equation (7).

$$\left.\begin{array}{l} \sigma_{ya} = \sqrt{\frac{1}{N} \sum_{i=1}^{N} (Yai - \mu_{ya})^2} \\ \sigma_{yb} = \sqrt{\frac{1}{N} \sum_{i=1}^{N} (Ybi - \mu_{yb})^2} \\ \sigma_{yc} = \sqrt{\frac{1}{N} \sum_{i=1}^{N} (Yci - \mu_{yc})^2} \\ \sigma_{yd} = \sqrt{\frac{1}{N} \sum_{i=1}^{N} (Ydi - \mu_{yd})^2} \end{array}\right\} \quad (7)$$

The variances $\sigma_{ya}$, $\sigma_{yb}$, $\sigma_{yc}$ and $\sigma_{yd}$ thus calculated are delivered to the correlation coefficient calculating device 39.

A reference data output device 41 memorizes reference vibration data Zai, Zbi, Zci and Zdi which have been previously measured with the same machine in the state of rubbing under the same condition of operation, together with the mean values $\mu_{za}$, $\mu_{zb}$, $\mu_{zc}$ and $\mu_{zd}$ of these data, as well as the variances $\sigma_{za}$, $\sigma_{zb}$, $\sigma_{zc}$ and $\sigma_{zd}$. These data are delivered to the correlation coefficient calculating device 39.

In the correlation coefficient calculating device 39, correlation coefficients $\gamma_a$, $\gamma_b$, $\gamma_c$ and $\gamma_d$ are calculated for respective measuring points, in accordance with the following equation (8), from the actually measured vibration data on the stationary bodies (Yai, $\mu_{ya}$, $\sigma_{ya}$; Ybi, $\mu_{yb}$, $\sigma_{yb}$; Yci, $\mu_{yc}$, $\sigma_{yc}$; Ydi, $\mu_{yd}$, $\sigma_{yd}$) and the reference data, i.e. the vibration data previously measured on the stationary bodies of the same rotary machine in the state of rubbing under the same operating condition.

$$\left.\begin{array}{l} \gamma_a = \frac{1}{N} \sum_{i=1}^{N} (\frac{Yai - \mu_{ya}}{\sigma_{ya}})(\frac{Zai - \mu_{za}}{\sigma_{za}}) \\ \gamma_b = \frac{1}{N} \sum_{i=1}^{N} (\frac{Ybi - \mu_{yb}}{\sigma_{yb}})(\frac{Zai - \mu_{zb}}{\sigma_{zb}}) \\ \gamma_c = \frac{1}{N} \sum_{i=1}^{N} (\frac{Yci - \mu_{yc}}{\sigma_{yc}})(\frac{Zci - \mu_{zc}}{\sigma_{zc}}) \end{array}\right\} \quad (8)$$

-continued
$$\gamma_d = \frac{1}{N} \sum_{i=1}^{N} (\frac{Ydi - \mu_{yd}}{\sigma_{yd}})(\frac{Zdi - \mu_{zd}}{\sigma_{zd}})$$

The correlation coefficients thus obtained for respective measuring points are delivered to a comparing device 45. These correlation coefficients $\gamma_a$, $\gamma_b$, $\gamma_c$ and $\gamma_d$ for respective measuring points thus obtained are compared in the comparing device 45 with a reference correlation coefficient $\gamma_o$ which is the reference for judging whether rubbing is taking place or not. The value of the reference correlation coefficient $\gamma_o$ by which whether rubbing is taking place or not is judged has been previously obtained through experiments and set beforehand by a reference coefficient setting device 47.

The results of the comparison in the comparing device 45 for respective measuring points are then delivered to a rubbing position ranging device 49. If the correlation coefficient for one or more measuring points, e.g. the correlation coefficient $\gamma_a$, exceeds the level of the reference correlation coefficient $\gamma_o$, the rubbing position ranging device 40 outputs the correlation coefficient $\gamma_a$ and the corresponding measuring point 17a, so that the position of the rubbing is ranged.

In the course of the comparison of the correlation coefficients for respective measuring points with the reference correlation coefficient $\gamma_o$, an output signal is delivered by the comparing device 45 to an alarm generating device 51 and a control signal output device 53, at any time when the reference correlation coefficient $\gamma_o$ is exceeded by any one of the correlation coefficients for respective measuring points.

The alarm generating device 51, upon receipt of the signal from the comparing device 45, generates an alarm to inform the operator of the occurrence of the rubbing. Meanwhile, the control signal output device 53 generates and delivers a control signal to a controller (not shown) in response to the output signal delivered by the comparing device 45 as a result of the rubbing.

The controller is adapted to make a suitable recovering control for eliminating the cause of the rubbing, such as deceleration of the rotating body, suppression of change of load and so forth, in accordance with the kind of the cause.

Correlation coefficients were calculated from the vibration data actually measured on the stationary body of a turbine having a construction specified below and from data previously obtained with the same machine in the state of rubbing under the same operating condition, by way of example. It was confirmed that, if rubbing is taking place during measuring, the correlation coefficient falls between 0.7 and 0.8, whereas, when no rubbing is taking place during the measuring, the correlation coefficient falls within the range of between 0.3 and 0.6.

The construction of the turbine as used in the experiment was as follows:

| | |
|---|---|
| type of bearing | plain bearing |
| housings | made of steel |
| rotary body | solid (not hollow) shaft |
| stationary body | shaft packing |
| vibration data sampling position | shaft packings supported by the housings |

Thus, in the turbine having the construction specified above, the value of 0.7 is selected and used as the reference correlation coefficient $\gamma_o$. In this case, therefore, it is judged that rubbing is actually taking place, when the correlation coefficient as obtained from the actually measured value has exceeded 0.7.

In the described method, a high reliability of the detection of rubbing is ensured because the detection is made in accordance with the result of the comparison of the calculated correlation coefficient with a preselected reference correlation coefficient. The detection of the occurrence of rubbing can be made also by comparing the changing rate of the calculated correlation coefficient, i.e. a value obtained through differentiating the correlation coefficient by time, with a preselected reference differential value. By so doing, it is possible to detect the occurrence of rubbing with a higher accuracy.

More specifically, referring to FIG. 1, the correlation coefficients $\gamma_a$, $\gamma_b$, $\gamma_c$ and $\gamma_d$ for respective measuring points delivered by the correlation coefficient calculating device 39 are delivered to a differentiator 55. The correlation coefficients in successive sampling periods are accumulated as the sampling is repeated.

In the differentiator 55, the correlation coefficients for respective measuring points are differentiated by time to provide the differential values $\alpha_a$, $\alpha_b$, $\alpha_c$ and $\alpha_d$ in accordance with the following equation (9).

$$\left. \begin{array}{l} \alpha_a = \dfrac{d\gamma_a}{dt} \\ \alpha_b = \dfrac{d\gamma_b}{dt} \\ \alpha_c = \dfrac{d\gamma_c}{dt} \\ \alpha_d = \dfrac{d\gamma_d}{dt} \end{array} \right\} \quad (9)$$

The differentiation of the correlation coefficient by time is advantageous in that it can eliminate other vibration components to make the vibration component attributable to the rubbing distinguishable from the other components, when a multiplicity of components are inlcuded by the vibration data as measured.

The differential values for respective measuring points as derived from equation (9) are delivered to and recorded in a record device 57. These differential values are then delivered to a comparing device 59 and compared with a differential value $\alpha_o$ which constitutes the reference for judging the occurrence of rubbing and which has been set by a comparison coefficient setting device 61. The differential value $\alpha_o$ has been beforehand obtained through experiments.

The result of the comparison made by the comparing device 59 is delivered to the rubbing position ranging device 49, as in the case of the comparison of the correlation coefficient. If the above-mentioned refernece differential value $\alpha_o$ is exceeded by a differential value for any one of the measuring points, e.g. by the differential value $\alpha_a$, the rubbing position ranging device 49 delevers the value $\alpha_a$ together with the corresponding measuring position which is in this case the measuring position 17a.

In addition, in the course of the comparison of the differential values for respective measuring points with the reference differential value $\alpha_o$, the comparing device 59 delivers an output signal to the alarm generating device 51 and to the control signal output device 53, at any time when the above-mentioned reference differential value $\alpha_o$ is exceeded by any one of the differential values for respective measuring points.

It will be understood that a higher accuracy of detection of rubbing is ensured by arranging such that the occurrence of the rubbing is detected and informed on OR condition of the correlation coefficient and the differential value of the correlation coefficient.

In the turbine having the aforesaid construction, the correlation coefficient was continuously determined and differentiated. It was found that the critical differential value at which rubbing takes place is between 0.1 and 0.5. Therefore, in this case, the value of 0.1 is selected and used as the reference differential value $\alpha_o$. Thus, it is judged that rubbing is taking place, when the value obtained by differentiating the correlation coefficient $\alpha$ exceeds 0.1, in the course of the determination of the correlation coefficient.

Although in this arrangement the detection of occurrence of rubbing is made on OR condition of the correlation coefficient and the differential value of the latter, it is possible to arrange such that the occurrence of rubbing is detected on AND condition of the correlation coefficient and the differential value of the correlation coefficient. By so doing, the accuracy of the detection is further improved and the fluctuation is remarkably suppressed. This arrangement is suitable for use particularly in the continuous observation or watching of the occurrence of rubbing. The above-mentioned OR or AND condition can suitably be set by making use of known OR or AND circuit.

In the embodiment described heretofore, the occurrence of rubbing is detected by determining the correlation coefficient and the differential value of the latter, from the actually measured vibration data on the shaft packings as the stationary body and from the reference vibration data which have been previously obtained with the stationary body in the state of rubbing. This embodiment, however, is not exclusive, and the invention can be carried out in different ways. For instance, according to the invention, it is possible to detect the occurrence of rubbing by obtaining by measuring the vibration data on a rotating body by means of a vibrometer attached to the rotating body, and determining the correlation coefficient and the differential value of the latter from the actually measured vibration data and reference vibration data which have been beforehand obtained with the same machine in the state of rubbing under the same operating condition.

FIG. 2 shows a system for carrying out a rubbing detecting method which is another embodiment of the invention. In this method, vibration data are obtained by measuring the vibrations of both of the rotating body and the stationary body, and the occurrence of rubbing is detected through determining the correlation coefficient calculated from both actually measured vibration data.

This method is useful particularly when there is no sufficient accumulation of reference vibration data on the rotating body and the stationary body in the state of rubbing. The results obtained by this method are accumulated and utilized as the reference data.

In FIG. 2, the parts equal or equivalent to those in FIG. 1 are denoted by the same reference numerals. The system shown in FIG. 2 differs from that shown in FIG. 1 in that vibrometers 11e, 11f, 11g and 11h for measuring the vibrations of the rotor shaft 25 are disposed in the vicinity of the points at which the vibrometers 11a–11d for measuring the vibrations of the stationary bodies are disposed, and that a data selection device 31', data record device 33', mean value calculating device 35' and a variance calculating device 37' are provided for processing the vibration data derived from the vibrometers 11e–11h. These devices 31', 33', 35' and 37' are materially identical to those of FIG. 1.

In operation, the vibration data from the vibrometers 11a–11d of the shaft packings 17a–17d and the vibration data from the vibrometers 11e–11h attached to the rotor shaft 25 are delivered to the data selection devices 31, 31', respectively. These data are delivered to and recorded by data record devices 33, 33', respectively.

The vibration data obtained at predetermined measuring points on the shaft packing and the rotor shaft, e.g. the points at which the vibrometers 11a and 11e are located, as obtained within a sampling period T, are represented, respectively, by Yai (i=1 to N) and Xei (i=1 to N), respectively. Then, as in the embodiment shown in FIG. 1, the correlation coefficients are obtained from the measured vibration data, in accordance with the following equations (10) to (14).

$$\mu_{ya} = \frac{1}{N} \sum_{i=1}^{N} Yai \quad (10)$$

$$\mu_{xe} = \frac{1}{N} \sum_{i=1}^{N} Xei \quad (11)$$

$$\sigma_{ya}^2 = \frac{1}{N} \sum_{i=1}^{N} (Yai - \mu_{ya})^2 \quad (12)$$

$$\sigma_{xe}^2 = \frac{1}{N} \sum_{i=1}^{N} (Xei - \mu_{xe})^2 \quad (13)$$

$$\gamma_{ae} = \frac{1}{N} \sum_{i=1}^{N} \left( \frac{Yai - \mu_{ya}}{\sigma_{ya}} \right)\left( \frac{Xei - \mu_{xe}}{\sigma_{xe}} \right) \quad (14)$$

The correlation coefficients thus obtained are then processed in the same manner as the embodiment shown in FIG. 1. The correlation coefficients $\gamma_{bf}$, $\gamma_{sg}$ and $\gamma_{dh}$ are obtained in the same manner.

An experiment with the same turbine as stated in the description of the first embodiment showed that the correlation coefficients in the rubbing state falls within the range of between 0.5 and 0.8. On the other hand, the correlation coefficient was 0.3 to 0.4, when no rubbing is taking place.

Therefore, in this case, the reference correlation coefficient $\gamma_o$ is set at 0.5, and it is judged that rubbing is taking place when the previously set reference correlation coefficient $\gamma_o = 0.5$ is exceeded by the correlation coefficient $\gamma$ as calculated from the vibration data obtained on the rotating body and the stationary body by actual measuring.

Also, the critical differential value of the correlation coefficient at which rubbing takes place was confirmed to fall within the range of between 0.1 and 0.5. In this case, however, the sampling period was 0.5 second.

In this case, therefore, the reference differential value $\alpha_o$ is set at 0.1, and it is judged that rubbing is taking place, if the reference differential value $\alpha_o = 0.1$ is exceeded by a differential value of $\alpha$ of the correlation coefficient during the same sampling period of 0.5 second.

In the described second embodiment, the vibration data on the rotor shaft are used as the vibration data of the rotating body. However, it is possible to use vibration data on a stationary part closely correlated to the vibration mode of the rotating body, e.g. the vibration data on the bearings, may be used in place of the vibration data on the rotor shaft.

What is claimed is:

1. A method of detecting rubbing taking place between a rotating body rotatively driven by a working fluid and a stationary body in support of said rotating body, said method comprising the steps of: measuring the vibrations at a plurality of points on at least one of said rotating body and said stationary body during a predetermined sampling period; obtaining correlation coefficients from a group of measured data constituted by both measured data or measured data on one of said rotating and stationary bodies and from any one of the groups of vibration data which have been previously measured and accumulated under the same condition and in the state of rubbing; comparing thus obtained correlation coefficients with predetermined reference correlation coefficients; and detecting the occurrence of said rubbing from the result of the comparison.

2. A method of detecting rubbing taking place a rotating body and a stationary body as claimed in claim 1, comprising the steps of: measuring over a common sampling period the vibrations at a plurality of points on said rotating body and the vibrations at a plurality of points on said stationary body corresponding to said points on said rotating body; calculating the correlation coefficients representing the correlation between the vibration data on each corresponding points; comparing thus obtained correlation coefficients with predetermined reference correlation coefficients; and detecting the occurrence of said rubbing from the result of the comparison.

3. A method of detecting rubbing taking place between a rotating body and a stationary body as claimed in claim 1, comprising the steps of: measuring the vibrations at a plurality of points on said stationary body over a predetermined sampling period; calculating correlation coefficients from thus measured vibration data and accumulated reference vibration data which have been previously measured on said stationary body in the state of rubbing under the same operating condition; comparing thus obtained correlation coefficients with predetermined reference correlation coefficients; and detecting the occurrence of rubbing from the result of the comparison.

4. A method of detecting rubbing taking place between a rotating body and a stationary body as claimed in claim 1, comprising the steps of: measuring the vibrations at a plurality of points on said rotating body over a predetermined sampling period; calculating correlation coefficients from thus measured vibration data and accumulated reference vibration data which have been previously measured on said rotating body in the state of rubbing under the same operating condition; comparing thus obtained correlation coefficients with predetermined reference correlation coefficients; and detecting the occurrence of rubbing from the result of the comparison.

5. A method of detecting rubbing taking place between a rotating body and a stationary body as claimed in any one of claims 1, 2, 3 and 4, further comprising the steps of obtaining differential values of said correlation coefficients; comparing thus obtained differential values with predetermined reference differential values; and detecting the occurrence of said rubbing from at least one of the result of said comparison of said differential values and the result of said comparison of said correlation coefficients with said predetermined reference correlation coefficients.

6. A method of detecting rubbing taking place between a rotating body and a stationary body as claimed in claim 5, wherein, when at least one of said correlation coefficient and said differential value exceeds respective predetermined reference values, at least one of said correlation coefficient or coefficients and said differential value or values exceeding said reference values, together with the point of measurement corresponding such correlation coefficient or coefficients or such differential value or values, is displayed.

* * * * *